United States Patent [19]

Vieth

[11] Patent Number: 4,468,983
[45] Date of Patent: Sep. 4, 1984

[54] TRANSMISSION REVERSER UNIT

[75] Inventor: Harold F. Vieth, Dubuque, Iowa

[73] Assignee: Deere & Company, Moline, Ill.

[21] Appl. No.: 513,496

[22] Filed: Jul. 13, 1983

Related U.S. Application Data

[63] Continuation of Ser. No. 216,032, Dec. 15, 1980, abandoned.

[51] Int. Cl.³ .................. F16H 3/44; F16D 13/00; F16D 13/52
[52] U.S. Cl. .................. 74/784; 74/781 R; 192/70.13; 192/70.19
[58] Field of Search .......... 74/781 R, 784, 750 R; 192/70.13, 70.19

[56] References Cited

U.S. PATENT DOCUMENTS

| 1,838,859 | 12/1931 | Nelson | 74/784 |
| 3,009,370 | 11/1961 | Frost | 74/784 |
| 3,043,163 | 7/1962 | Hobbs | 74/781 R X |
| 3,099,172 | 7/1963 | Jania et al. | 74/750 R X |
| 3,412,834 | 11/1968 | Root | 192/70.19 X |

Primary Examiner—Allan D. Herrmann
Assistant Examiner—Stephen B. Andrews

[57] ABSTRACT

A reverser unit including a carrier having a forward double planetary pinion rotatably mounted thereon located in a forward section of an enclosing housing. The first planetary pinion of the double planetary is sized larger than a second planetary pinion of the double planetary pinion. A first sun gear coupled to a sun shaft is in constant mesh with the first planetary pinion and a second sun gear rotatably mounted on the sun shaft is in constant mesh with the second planetary pinion. A clutch drum is coupled to the second sun pinion and is generally located in the rear section of said housing. The clutch drum is coupled to a brake clutch system in the rear section of the housing for selectively braking the clutch drum to the housing. A clutch hub is coupled to the sun shaft in the rear section of the housing. A clutch system in the rear section of the housing can selectively clutch the clutch hub to the clutch drum. A detachably mounted housing rear cover is detachable to allow the withdrawal of the brake clutch and hub clutch system without further disassembly of the reverser.

5 Claims, 1 Drawing Figure

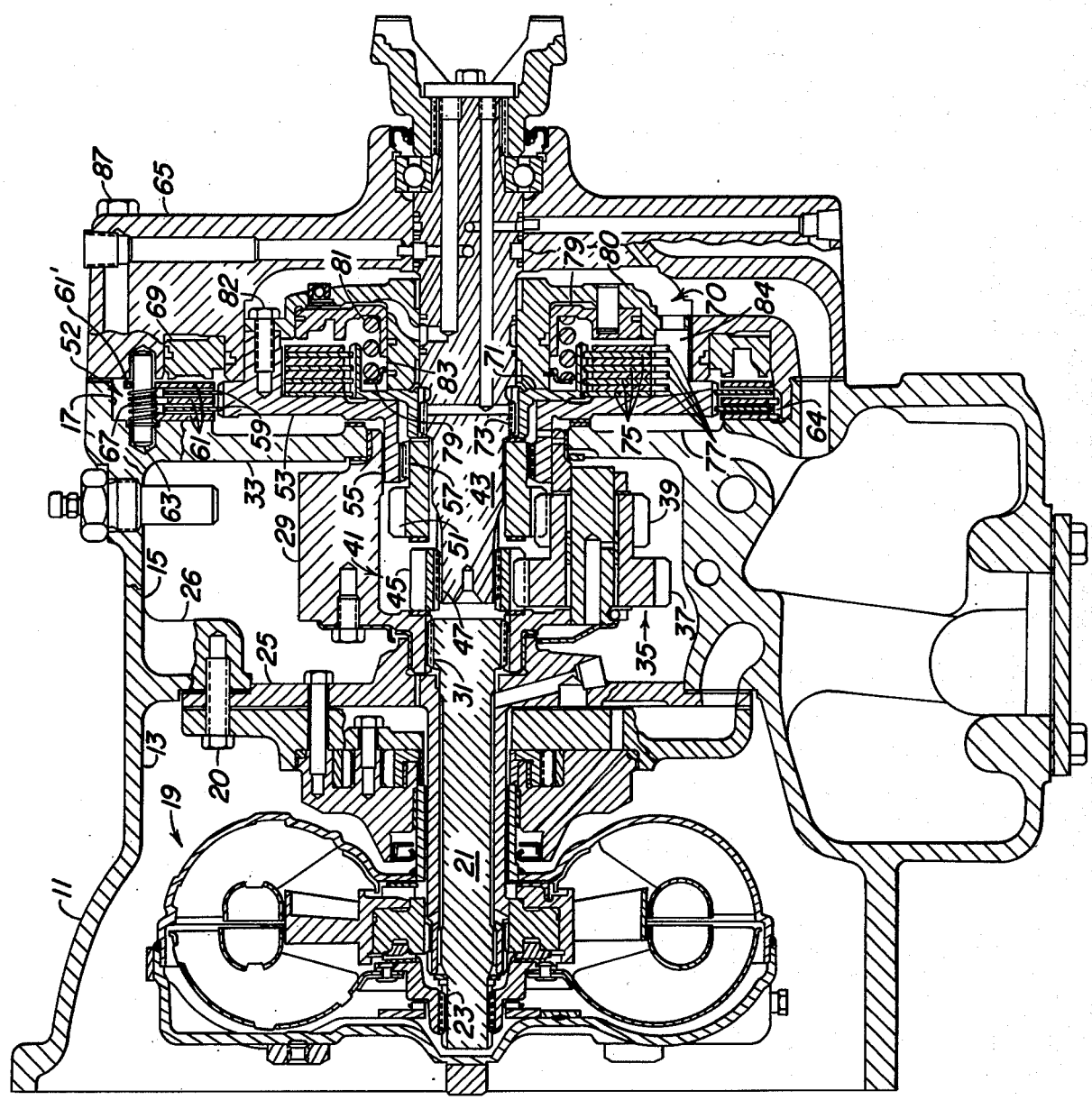

TRANSMISSION REVERSER UNIT

CROSS-REFERENCES TO RELATED APPLICATIONS

This application is a continuation of application Ser. No. 216,032 filed Dec. 15, 1980 now abandoned.

BACKGROUND OF THE INVENTION

This invention relates to hydraulically assisted transmission reverser units like those employed in off-road vehicles.

Off-road vehicles are generally utilized at job sites remote from a repair facility. Therefore, should a vehicle repair be necessary, substantial vehicle down time can be accumulated before a repair can be effectuated. In many cases involving worn or defectively operating major components, it is necessary to transport the vehicle from the job site to a distant repair facility. A power shift transmission reverser can represent just such a major component.

A power shift reverser includes clutch and/or brake assemblies housed within the reverser case. The clutch and brake assemblies are subject to wear degradation requiring their repair or replacement. In conventional reversers, the clutch and brake assembly cannot be serviced without totally removing the reverser from the vehicle and completely disassembling the reverser unit because of access limitation. As a result, the repair or replacement of the reverser clutch and brake assembly represents substantial vehicle down time.

The need to remove the reverser unit from the vehicle and disassemble the unit can also be predicated upon reassembly limitation. During the disassembly of a conventional reverser, it is necessary to disturb the sun pinions relative to the planetary pinions of a planetary gear assembly associated with the reverser in order to remove the clutch and/or brake assembly. Therefore, upon reassembly, it is necessary to reposition the sun pinions relative to the planetary pinions. A special case is presented when the number of sun pinion teeth is odd. In such cases, the number of relative locations in which the sun pinion will mesh properly with respective to the planetary pinions are limited, often requiring manipulation of the planetary pinion carrier to achieve a proper mesh.

SUMMARY OF THE INVENTION

It is therefore an objective of the present invention to present a power shift reverser unit with serviceability properties allowing the removal of the clutch and/or brake assemblies within the reverser without the necessity for total removal of the reverser unit from the vehicle drive train and in conjunction therewith requiring total disassembly of the reverser unit to gain access to the clutch and/or brake assemblies.

It is a further objective of the present invention to present a means of removing and replacing the reversers clutch and/or brake assemblies without disturbing the sun and planetary pinions of an associated planetary gear assembly.

The reverser includes a carrier having a double planetary pinion rotatably mounted thereon. The first pinion of the planetary is in constant mesh with a first pinion of a sun gear. The first sun pinion is splined to the sun gear shaft. The second pinion of the planetary is in constant mesh with a second sun pinion which is rotatably maintained along the sun gear shaft. The second sun pinion is in constant mesh with a clutch drum which extends into the rear portion of the reverser and coupled to a reverse brake. A planetary clutch hub is splined to the sun gear shaft and is clutchable to the clutch drum in the rear portion of the reverser. The brake and clutch assemblies are located in the rear portion of the reverser such that the rear cover can be removed whereupon the braking and clutch assemblies can be withdrawn from the reverser housing without the need for removing the reverser unit from a vehicle drive train and in conjunction therewith without the need to further disassemble the reverse unit.

The sun shaft, which also serves as an output shaft, is supported in a cantilever fashion by the rear cover and is longitudinally slidable in and out of the sun pinions. The sun shaft can, therefore, be withdrawn and reinserted central to the sun pinions without dislocation of the sun pinions. Further, the sun shaft portion within the first sun pinion can experience a degree of float such that the sun shaft can seek a concentric alignment to the sun pinions.

The present invention offers the benefit, when associated with a vehicle, of allowing job site repair of the reverser clutch and brake assembly by simply detaching the rear cover and slidably removing the clutch and the brake assemblies, and sun shaft. A substitute assembly can be inserted without the need for realigning the sun pinions.

Additional benefits of the present invention will be evidenced in the subsequent detailed description of the preferred embodiment of the invention

BRIEF DESCRIPTION OF THE DRAWINGS

The FIGURE is an elevated sectional view of a vehicle reverser in accordance with the present invention.

DESCRIPTION OF THE PREFERRED EMBODIMENT

Referring to the FIGURE, a housing 11 defines three cavities 13, 15, and 17. In the preferred embodiment, a conventional torque converter, generally indicated as 19, is fixably mounted by any conventional means to housing wall 25 in a first cavity 13. Housing wall 25, fixably mounted by any conventional means to a formed mounting ring 26 in housing 11, divides cavity 13 from cavity 15. The torque converter 19 is splined to an input shaft 21 at 23. The input shaft 21 is rotatably mounted by any conventional means in and extends through transmission wall 25. The input shaft 21 is splined to a carrier 29 at 31 located in a second cavity 15. The carrier 29 is rotatably supported by wall 25 at the left hand end and by a formed housing wall 33 in housing 11 at the right hand end by any conventional means. Housing wall 33 divides cavity 15 from 17. The carrier 29 has rotatably maintained thereon, by any conventional means, a formed double planetary pinion 35 having a first and second pinion 37 and 39, respectively. A sun gear 41 includes a sun gear shaft 43 extending generally co-linearly with the input shaft 41 and at the left hand end placed generally central to the carrier 29; a first sun pinion 45 splined to one end of sun shaft 43 at 47 and in constant mesh with the first pinion 37 of the planetary pinion 35; and, a second sun pinion 51 encircling the sun shaft 43 in constant mesh with second pinion 39 of double planetary pinion 35. A portion of the sun gear shaft 43 extends beyond the sun gear 41 to serve as an output shaft. It is observed that the planetary pinions 37 and 39 are of different sizes, planetary pinion 37 being the larger.

To form a brake assembly 52, a clutch drum 53 has a generally disc-like configuration having a circular collar 55 defining a hole at its center. The collar 55 is inserted into the carrier 29 at its right-hand end and splined to sun pinion 51 at 57, the disc portion of drum 53 being parallel to and beyond wall 33 on the right hand side in housing cavity 17. Splined to the outer periphery of the drum 53 is a first and second friction disc 59. Placed to each side of friction discs 59 is friction pads 61. The friction discs 61 are longitudinally slidably mounted around a plurality of pins 63 each pin 63 having one end inserted in housing wall 33 and the other end inserted in a rear cover 65 enclosing the rear portion of housing 11. The sun shaft 43 is also rotatably mounted in rear cover 65 and extends therethrough. Friction pads 61 are also slidable along slots 64 in rear cover 65. An outer friction pad 61 slidable along pin 63 is biased by a spring 67 placed around pin 63. A brake piston 69, having a generally ring configuration, is slidably mounted opposite to plate 61 in a conforming cavity of the rear cover 65 and is hydraulically actuated in a conventional manner to brake drum 53 to housing 11.

To form a clutch assembly 70, a planetary clutch hub 71 is splined to shaft 43 at 73 generally in housing cavity 17. Splined to the outer periphery of clutch hub 71 are a plurality of friction discs 75. Interspersed between friction discs 75 are friction pads 77. In the preferred embodiment, a clutch cover 80 is fixably mounted in a clutch drum 53 by a plurality of bolts 82 and rotatably mounted around sun shaft 43 such that the friction pads 77 and friction disc 75 are between clutch drum 53 and clutch cover 80. The friction pads 77 can axially slide in slots 84. A ring-like clutch piston 79 is slidably mounted opposite to the friction discs 75 and plates 77 in a conforming cavity of clutch cover 80, the clutch piston 79 being hydraulically actuated by any conventional means to clutch hub 71 to drum 53. A spring 81 biases clutch piston 79 to a release position. The spring 81 is placed in a clutch cover sleeve 83 between a stop member 85 and clutch piston 79.

By actuating clutch piston 79 in a conventional manner, clutch hub 71 is clutched to drum 53 causing sun pinion 51, drum 53, hub 71 and sun shaft 43 to rotate as a unit. The input shaft 21 rotates in the same direction as the carrier 29. The planetary pinions 37 and 39 want to rotate respective sun pinions 45 and 51 at different rates but are unable to because sun pinions 45 and 51 are coupled to sun shaft 43, therefor, the sun gear shaft 43 will be rotated by the carrier 29 in the same direction. By releasing clutch piston 79 and actuating brake piston 69, sun pinion 51 is coupled to housing 11, thereby being held stationary relative to housing 11. As the input shaft 21 turns carrier 29, planetary pinion 39 is forced to walk around sun pinion 51 causing planetary pinion 37 to rotate sun gear shaft 43 in the opposite direction from carrier 29.

It is observed that the rear cover 65 is secured to the housing 11 by a plurality of bolts 87. Removing bolts 87 allows cover 65 to be removed from the housing 61 bringing therewith brake assembly 52 and clutch assembly 70, in addition to sun shaft 43. It is noted that clutch drum 53 can slidably disengage sun pinion 51 longitudinally. Should upon detachment of rear cover 65 sun pinions 45 and 51 attempt to ride sun shaft 43, upon withdrawal of the recover approximately ¾ to 1 inch from the housing 11, a screwdriver or other such tool can be inserted into the housing to restrain the sun pinions 45 and 51 within the planetary pinions 35.

The sun pinions 45 and 51, therefor, remain centered and timed to planetary pinions 37 and 39, respectively.

It is observed that the clutch and brake assemblies 70 and 52 are maintained in the rear cover 65 in part riding on and centered by the shaft 43, such that upon reinstallation of the rear cover 65 to the housing 11 a mating fit is assured. In particularly, shaft 43 is aligned to journey through sun pinion 51 to be splinably received by pinion 51 at 57. The clutch assembly 70, brake assembly 52 and sun shaft 43 can simply be slid back into place, and secured by the reattachment of bolts 87. Since sun pinions 48 and 51 are not disturbed, there is no need to retime the planetary gear set.

It is further observed that the sun shaft 43 is supported in a cantilevered fashion by the end cover 65 and that sun pinion 51 is spaced apart from sun shaft 43. This arrangement allows the sun shaft 43 to experience a limited degree of float which allows the sun shaft 41 portion splined to sun pinion 45 to seek an approximating concentric alignment, eliminating the need for elaborate shaft alignment procedures to prevent binding of the sun pinions.

I claim:

1. An improved reverser of the type in which a housing fixably mounted in a vehicle drive train rotatably contains a carrier having a plurality of coupled first and second planetary pinions rotatably mounted on said carrier, said first planetary pinions having a larger diameter than said second planetary pinions, a first sun pinion located generally central to and maintained by said first planetary pinions and in constant mesh therewith, a second sun pinion located generally central to and maintained by said second planetary pinions and in constant mesh therewith, wherein the improvement comprises:

a rear cover detachably mounted to said housing;
   a housing rear wall located within said housing and having a centrally located aperture rotatably supporting the rearward end of said carrier in said aperture;
   a sun shaft rotatably mounted in said rear cover and extending forward into said housing;
   said sun shaft journeying generally centrally through and radially spaced apart from said second sun pinion to be splineably received in said first sun pinion;
   braking means including a clutch drum having a collar portion splineably receiving the rearward portion of said second pinion for selectively causing said second pinion to assume a locked stationary or unlocked nonstationary position relative to said housing;
   clutching means for selective coupling or uncoupling said clutch drum to said sun shaft;
   said braking and clutching means being supported rearward in said housing such that upon detachment of said rear cover, said braking and clutching means can be withdrawn from or reinstated in said housing without removing said first and second sun pinions or dislocating said housing.

2. A reverser as claimed in claim 1 wherein said braking means comprising:
   a plurality of first friction discs slidably mounted on the outer periphery of said clutch drum such that said first friction discs can slide perpendicular to said clutch drum;

a plurality of mounting pins inserted into a plurality of colinearly aligned holes in said housing rear wall and said rear cover;

a plurality of first friction pads slidably suspended from said pin interdispursed between said first friction discs;

a brake piston ring slidably mounted in a cavity of said rear cover opposite to said first friction discs and said second friction pads, said brake piston ring to slidably assume a engaged position bias said first friction discs and said first friction pads against one another and said rear housing wall and a disengaged position in spaced apart relationship thereto; and actuating means for selectively actuating said brake piston to an engaged position or disengaged position.

3. A reverser as claimed in claim 1 wherein said clutching means comprises:

a clutch hub splined around said sun shaft rearward of said second sun pinion;

a plurality of second friction discs slidably mounted around and coupled to the outer periphery of said clutch hub such that said second friction discs can only slide perpendicular to said clutch hub;

a plurality of second friction pads interspersed between said second friction discs;

means for slidably mounted said second friction pads to said clutch drum such that said second friction disc can slidably move only perpendicular to said clutch drum;

a clutch piston ring;

means for slidably mounting said clutch piston ring opposite to said second friction discs and said fourth friction pads, said clutch piston to slidable assume a clutch engaged position biasing against said second friction discs and said second friction pads against said clutch drum and a disengaged position spaced apart therefrom;

biasing means for biasing said clutch piston in a disengaged position; and actuation means for actuating said first clutch piston to said engaged position.

4. A reverser as claimed in claim 3 wherein said means for slidably mounting said clutch ring comprises:

a clutch cover rotatably mounted on said sun shaft rearwardly beyond said clutch hub;

a plurality of cap screws fixably mounting said clutch cover to said clutch drum, said clutch cover including a radial cavity conforming to said clutch piston configuration to allow said clutch piston to slide axially with said cavity.

5. A reverser, comprising:

a housing including a forward section and rear section divided by a formed rear housing wall, a forward wall fixably mounted in said housing dividing said forward section into a first forward section and a second forward section;

a carrier rotatably mounted in said forward wall and said rear wall located in said second forward section;

means for drivably rotating said carrier located in said first forward section including an input shaft rotatably mounted in and extending through said forward wall drivably coupled to said carrier;

a doubled planetary pinion rotatably mounted on said carrier including a first planetary pinion and a second planetary pinion coupled to rotate on said carrier at the same rate, said first planetary pinion to have a larger radius than said second planetary pinion;

a sun shaft having an axial extension co-linear to said input shaft extending from said second forward section beyond said rear section of said housing and located centrally to said carrier;

a first sun pinion fixably mounted around said sun shaft in constant mesh with said first planetary pinion;

a second sun pinion rotatably mounted on said sun shaft having a rearwardly axially extending section, said rearwardly axial extension being generally radially opposite said rear wall, said second sun pinion in constant mesh with said second planetary pinion whereby rotation of said carrier causes said double planetary pinion to attempt to rotate said first and second sun pinion at different rates;

a clutch drum generally located in said rear section of said housing having a centrally located collar fixably mounted around said rearwardly axially extending section of said second sun pinion;

a plurality of parallelly aligned first friction drum around the outer periphery of said clutch disc;

a rear cover detachably mounted to said housing enclosing said rear section of said housing having rotatably mounted therein and extending therethrough said sun shaft;

a plurality of pins extending into said rear wall of said housing and said rear cover;

a plurality of second parallely aligned friction discs suspended from and slidable axially along said pins, said second friction disc interdispursed between said first friction disc;

biasing means for biasing said axially extreme friction disc apart such that one said extreme friction disc is biased against said rear wall and the other extreme friction disc is biased against a portion of said rear cover;

a brake piston slidably mounted in a cavity of said rear cover opposite said first and second friction disc to slide axially to assume an engaged position biasing against said first and second friction disc and a disengaged position spaced apart from said first and second friction disc;

means for selectively actuating said brake piston to assume an engaged and disengaged position;

a clutch hub fixably mounted around said sun shaft;

a plurality of third friction discs axially splined around the outer periphery of said clutch hub;

a plurality of fourth friction discs interspersed between said third friction disc;

a clutch covver rotatably mounted on said sun shaft rearwardly beyond said clutch hub;

a plurality of cap screws fixably mounting said clutch cover to said clutch drum, said fourth friction discs having a plurality of U-shaped recesses spaced around their outer peripheral edge into mating relation to said cap screw stem such that said fourth friction discs are supported by said cap screws to restrain rotational motion and allow said fourth disc to axially slide along said cap screws;

a clutch piston slidably mounted in a recess in said clutch cover opposite said third and fourth friction disc to allow said clutch piston to slidably assume an engaged position biasing against said third and fourth friction disc and a disengaged position spaced apart from said third and fourth friction disc;

means for selectively actuating said clutch disc to assume an engaged and disengaged position; and means for biasing said clutch piston in said disengaged position whereby removal of said clutch cover allows items through with further disassemble of said reverser.

* * * * *

UNITED STATES PATENT AND TRADEMARK OFFICE
CERTIFICATE OF CORRECTION

PATENT NO. : 4,468,983

DATED : 4 September 1984

INVENTOR(S) : Harold Frederick Vieth

It is certified that error appears in the above-identified patent and that said Letters Patent is hereby corrected as shown below:

Column 5, line 10, delete "a" and insert -- an --; same line, delete "bias" and insert -- biasing --.

Column 6, line 31, delete "parallely" and insert -- parallelly --.

Column 4, line 64, delete "comprising" and insert -- comprises --.

Column 5, line 28, delete "mounted" and insert -- mounting --.

Column 6, line 54, delete "covver" and insert -- cover --.

Signed and Sealed this

Twenty-third Day of April 1985

[SEAL]

Attest:

DONALD J. QUIGG

Attesting Officer  Acting Commissioner of Patents and Trademarks